UNITED STATES PATENT OFFICE.

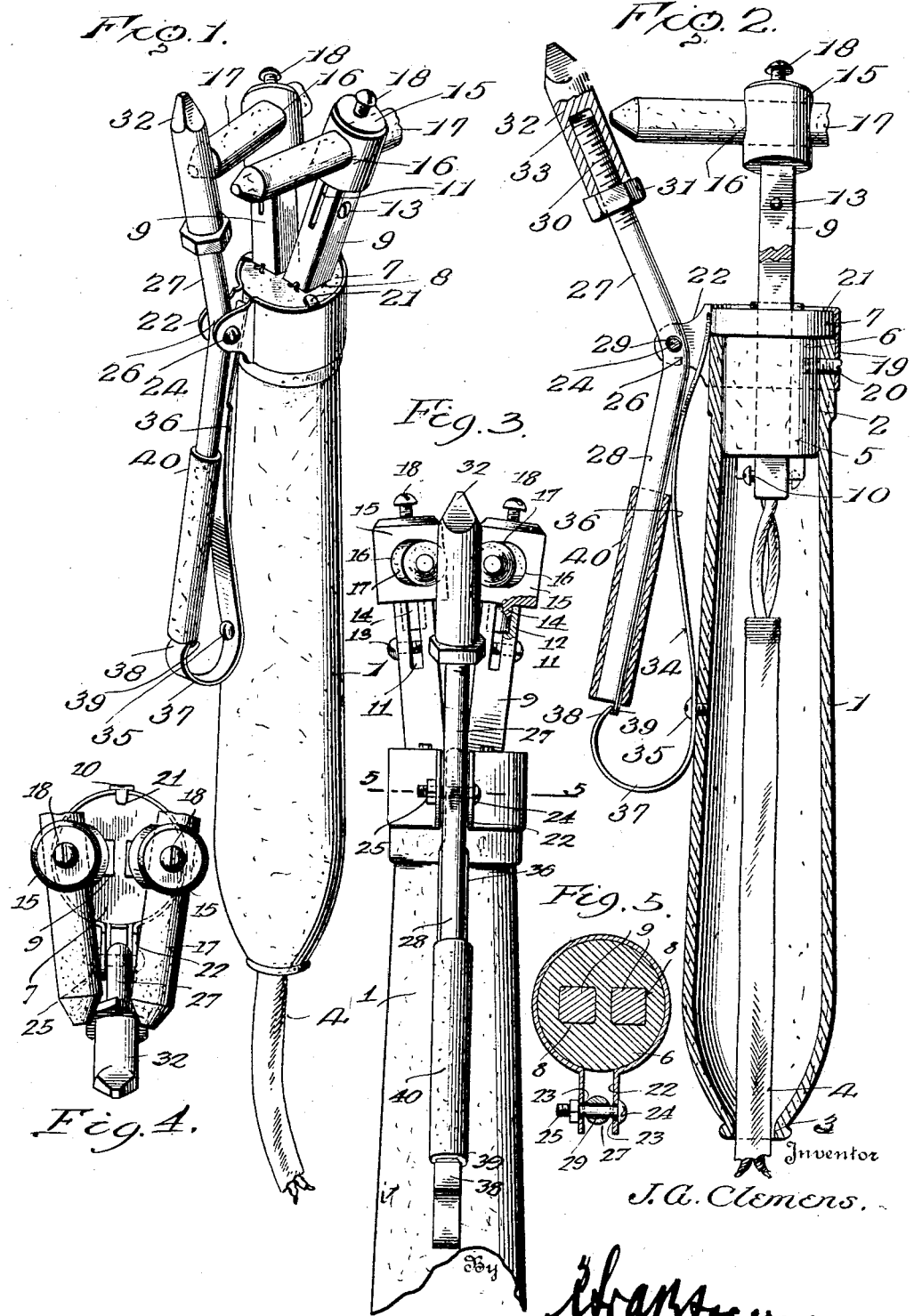
J. G. CLEMENS.
ELECTRIC SOLDERING IRON.
APPLICATION FILED DEC. 5, 1917.
1,286,230.
Patented Dec. 3, 1918.

JOHN G. CLEMENS, OF BUFFALO, NEW YORK.

ELECTRIC SOLDERING-IRON.

1,286,230.  Specification of Letters Patent.  Patented Dec. 3, 1918.

Application filed December 5, 1917. Serial No. 205,656.

*To all whom it may concern:*

Be it known that I, JOHN G. CLEMENS, a citizen of the United States, residing at Buffalo, in the county of Erie and State of New York, have invented certain new and useful Improvements in Electric Soldering-Irons, of which the following is a specification.

This invention relates to electric soldering irons and the primary object of the invention is to provide an electric soldering iron possessing such characteristics that when the iron is to be used, the tip thereof may be practically instantaneously heated and maintained at the proper degree of temperature for any desired length of time. One disadvantage attending the use of an ordinary soldering iron is that a considerable length of time is required to thoroughly heat the iron, the copper tip of the iron being relatively large so as to retain the heat for a maximum length of time after having been brought to the proper temperature. Thus considerable time and fuel must be expended in initially heating such an iron and repeatedly reheating the same. The present invention therefore contemplates the provision of an electric soldering iron so constructed that a tip of minimum size may be employed so that when brought into contact with the spaced carbons of the iron it will be practically instantaneously brought to the desired degree of temperature and kept at such degree while being used during the soldering operation, so that the workman is not required to waste time in waiting for the iron to become heated, work of a more uniform character can be done as the iron, during use, can be kept at a uniform degree of temperature, and, there is no waste of fuel in heating the iron inasmuch as when it is desired to temporarily discontinue the use of the iron the tip may be moved out of contact with the carbons and, when it is again desired to make use of the iron, may be again brought into contact with the carbons, and, as stated, practically instantaneously reheated. The soldering iron of the present invention is also designed to obviate the employment of two or more irons, as is at present the custom, one iron at the present time being heated while another iron is in use.

As above indicated, the iron embodying the present invention includes spaced carbon contacts to which electric current is supplied, and a tip which is to be moved into and out of position contacting the said carbons, and it is another aim of the invention to so mount the tip that as the same is permitted to move into contact with the carbons, the tip will automatically aline itself between the carbons so as to insure of proper electric contact therewith.

Another aim of the invention is to so construct the iron and so support the tip that the iron will be highly efficient in spot soldering, the tip being yieldably held out of contact with the carbons and yet in such a manner as to permit of its being brought into contact with the carbons when pressure is brought to bear against the tip by contact with the work as is naturally done in the use of any soldering iron, this feature of the invention providing for the automatic closing of the electric circuit to heat the iron when the iron is brought into contact with the work and automatic breaking of the circuit when the iron is relieved of pressure.

Another object of the invention is to so mount the tip of the iron that the position of the tip with relation to the carbons may be conveniently varied by the hand which grips and supports the iron as a whole, so that the use of the iron may be controlled by the hand which supports it.

In the accompanying drawings:

Figure 1 is a perspective view of the electric soldering iron embodying the present invention;

Fig. 2 is a vertical longitudinal sectional view therethrough taken on a plane between the carbons and in alinement with the support for the tip of the iron;

Fig. 3 is a view in elevation of the iron, looking at that side thereof in which the tip is mounted;

Fig. 4 is an end elevation of the iron;

Fig. 5 is a horizontal sectional view on line 5—5 of Fig. 3.

The soldering iron embodying the present invention includes a hollow handle 1 of any suitable material, although preferably insulating material is employed in its manufacture. At its forward end the handle 1 is open, as indicated by the numeral 2, and at its rear end the handle is interiorly reduced to provide a relatively small opening 3 through which the insulated conductor wires 4 are led into the interior of the handle. A bushing 5 has a cylindrical body portion 6 which is snugly fitted into the open end 2 of the handle 1, and this bushing is formed at its outer end with a circumscribing flange or shoulder 7 which rests against the outer end of the said handle. The body 6 of the bushing 5 is formed with spaced rectangular openings 8 extending longitudinally therethrough, and fitted in these openings are the inner portions of metallic supporting posts 9 for the carbons heretofore mentioned. At their inner ends the posts 9 project into the hollow handle 1 and have connected to them, as for example by binding screws 10, the terminals of the conductor wires 4 so that current is supplied to the said posts, the posts, however, being insulated from each other by the bushing 6 which is of a suitable insulating material. Beyond the outer end of the bushing, the posts 9 are extended along diverging lines and the said outer end of each post is split longitudinally, as indicated by the numeral 11, the splits in the sides of the post opening into the opposite sides of a cylindrical socket 12 formed longitudinally in the said outer end of the respective post and opening through the extremity thereof. Clamping screws 13 are fitted through the sides of the socket 12 at the opposite sides of the splits 11 and may be tightened for the purpose of contracting the sockets to cause the walls thereof to frictionally bind and hold against rotation, stems 14 carried by carbon holding heads 15, there being one of said heads supported upon each of said posts. Each of the carbon supporting heads has a transverse carbon receiving bore or opening 16 into which is fitted a stick of carbon 17 held at adjustment by means of a binding screw 18 fitted through the outer end of the head 15 and bearing against the said stick. By reason of this construction the carbon sticks may be adjusted to project a greater or less distance beyond the heads 15 and also the heads 15 may be rotatably adjusted upon the outer ends of the posts 9 so as to vary the distance between the outer or contact ends of the carbons and also whereby to adjust the carbons at the said contact ends with relation to the tip of the iron, as will be presently made apparent.

In providing a support for the tip of the iron, a collar 19 is provided and this collar is open at one side and is fitted to and surrounds the outer end of the handle 1 and the shoulder 7 of the bushing 5, as clearly shown in Fig. 2 of the drawings, the collar being securely held in place by means of a set screw 20 fitted therethrough and through the said handle 1 and into the bushing 5. A suitable number of lugs 21 are formed upon the outer edge of the collar 19 and project inwardly in engagement with the outer end face of the body of the bushing 5 so as to maintain the parts in proper relative positions. At its open side, the collar is formed with spaced ears 22 formed with alined openings 23 through which is passed a small bolt 24 secured by a nut 25 threaded thereon. The intermediate portion of the shank of the bolt is unthreaded so as to serve as a pivot for the tip supporting member, which member is in the nature of a lever, indicated in general by the numeral 26, and having arms 27 and 28 which extend at obtuse angles with relation to each other and each of which serves a purpose to be presently explained. At the juncture of the arms 27 and 28, the lever is formed with a transverse opening 29 which is of a diameter greater than that of the shank of the pivot bolt 24 so that when the parts have been assembled and the nut 25 has been threaded onto the bolt but not so tightly as to bring the ears 22 into contact with the opposite side faces of the lever 26, the said lever may have not only pivotal movement upon the bolt but also a slight lateral motion thereon, and the reason for thus mounting the lever will be presently specifically pointed out. The forward end portion of the arm 27 of the lever is threaded, as indicated by the numeral 30, and adjustably fitted thereon is a jam nut 31. The soldering tip is indicated by the numeral 32 and is as usual formed of copper but is much smaller than the tip ordinarily employed. In fact I have found that, whereas in the ordinary soldering iron a copper tip weighing about five pounds is usually employed, in the instance of my invention the tip need weigh only about two ounces. The tip is formed with a longitudinal bore 33 which is threaded and opens at the butt end of the tip and in this manner the tip is adapted to be threaded onto the portion 30 of the arm 27 and after having been applied to the arm is securely held in position by tightening the jam nut 31 to cause the latter to bear against the said butt end of the tip. By reference to the several figures of the drawings it will be observed that the lever 26 is so mounted that the tip may be supported opposite and between the contact ends of the carbons and that by moving the lever upon its pivot the tip may be brought into contact with the said carbons or moved out of position for such contact. In order to yieldably hold the lever locked in such position that the soldering tip may be out of contact with the carbons, a leaf spring indicated in general by the numeral 34, is secured at an intermediate point in its length, as at 35, to that side of the handle 1 at which the lever 26 is supported, and this spring has a forwardly extended portion 36 which is outwardly bowed with relation to the said handle so that it engages against the inner side of the arm 28 of the lever and at its extremity rests against the shoulder 7 of the bushing 5, as clearly shown in Fig. 2 of the drawings. At the opposite side of its point of attachment, the spring 34 extends laterally outward along a curved line, as indicated by the numeral 37, with its extremity directed toward and in the path of movement of the extremity of the arm 28 of the lever 26 so as to form a latch element, indicated by the numeral 38. The said end of the arm 28 is provided with a shoulder 39 designed to engage behind the latch portion 38 of the spring, as shown in Fig. 2, whereby to yieldably hold the lever 26 in such position that the soldering tip will be out of contact with the carbons, the portion 36 of the spring at the same time tending to swing the lever upon its pivot so as to bring the tip into contact with the carbons. A heat insulating sleeve 40 is preferably fitted onto the outer portion of the arm 28 of the lever 26.

From the foregoing description of the invention it will be understood that ordinarily the lever 26 is to be held in the position shown in Fig. 2 of the drawings, that is to say, when the iron is not in use. When it is desired to use the iron the forefinger of the hand which grips the handle 1 is engaged in the bend 37 in the spring 34 and moved rearwardly so as to cause disengagement of the latch end 38 of the spring from the shoulder 39. The bowed portion 36 of the spring will then act immediately to rock the lever 26 upon its pivot so as to cause the soldering tip to seat between and in contact with the carbons 17, whereupon the circuit will be closed and the said tip will be practically instantaneously heated to the desired degree of temperature. When it is desired to temporarily discontinue use of the iron, the forefinger of the hand gripping the handle 1 is engaged with the sleeve 40 upon the arm 28 of the lever 26 and moved inwardly toward the handle so as to swing the lever upon its pivot thereby bringing the soldering tip out of contact with the carbons and causing the shoulder 39 to slip past and engage behind the latch end 38 of the spring 34, whereupon by reason of such engagement of the parts the lever will be yieldably held in the position shown in Fig. 2. When employing the iron in spot soldering it is only necessary to bring the point of the soldering tip into contact with the work and exert pressure as is customary in the use of any soldering iron. This will result in the arm 27 of the lever 26 being swung toward the carbon so as to bring the soldering tip into contact therewith, this movement being yieldably resisted by the outward pull exerted against the bend 37 of the spring 34 by the outward movement of the arm 28 of the said lever. Of course, as soon as the tip is relieved of pressure against the work, the bend 37 of the spring tending to again contract, will pull inwardly upon the outer end of the arm 28 of the lever thereby swinging the lever upon its pivot to move the tip out of contact with the carbons. As before stated the opening 27 in the lever 26 is of a diameter considerably greater than that of the pivot bolt 24 and, consequently, should the carbons burn unevenly, or if for any other reason the tip should be slightly out of alinement with a point midway between the carbons, it will automatically aline itself with relation to the carbons to insure a proper contact therewith, when the lever is released for swinging movement under the influence of the portion 36 of the spring, for if the soldering tip engages one of the carbons before it does the other, it will automatically accommodate itself to a position in contact with both carbons as the lever is laterally swung or moved.

Having thus described the invention, what is claimed as new is:

1. In a soldering iron, a handle, local heating means upon the handle, a member mounted upon the handle, and a soldering tip carried by the said member, the member being adjustable to move the tip into and out of position to be acted upon by the heating means.

2. In a soldering iron, a handle, local heating means upon the handle, and a soldering tip upon the handle movable into and out of position to be acted upon by the heating means.

3. In a soldering iron, a handle, local heating means upon the handle, a member mounted upon the handle, a soldering tip carried by the said member, means tending to move the member in a direction to bring the tip into position to be acted upon by the heating means, and means for holding the said member against such movement.

4. In a soldering iron, a handle, local heating means upon the handle, a manually movable lever member mounted upon the handle, a soldering tip carried thereby, means tending to move the lever in a direction to bring the soldering tip into position to be acted upon by the heating means, and means for holding the lever against such movement.

5. In a soldering iron, a handle, local heating means upon the handle, a member movably mounted upon the handle, a soldering tip carried by the said member, and means yieldably holding the member in position with the tip spaced from the heating means.

6. In a soldering iron, a handle, local heating means upon the handle, a member movably mounted upon the handle, means tending to so move the member as to bring the tip into position to be heated by the heating means, and means active to yieldably resist the movement of the said member under the influence of the first-mentioned moving means.

7. In a soldering iron, a support, local heating means upon the support, a member movably mounted upon the support, a soldering tip carried by the member, means tending to move the member in such a manner as to bring the soldering tip into position to be acted upon by the heating means, and means engageable by the said movable member for yieldably resisting the movement thereof under the influence of the said moving means and to yieldably hold the said member against movement to bring the said tip into position to be acted upon by the heating means.

8. In a soldering iron, a support, a local heating means upon the support, a lever member mounted for rocking movement upon the support, a tip carried by the said member at one side of its pivot, and a spring mounted upon the support and having a portion coacting with the lever member at the opposite side of its pivot tending to rock the said member in a direction to bring the soldering tip into position to be acted upon by the heating means, the said spring having another portion engageable by the said lever member at the last-mentioned side of its pivot to yieldably resist the action of the first-mentioned portion of said spring against the said lever member.

9. In a soldering iron, a support, local heating means upon the support, a lever member mounted for rocking movement upon the support, a tip carried by the lever member at one side of the pivot thereof, a spring mounted upon the support and having a portion bearing yieldably against the said lever at the other side of the pivot thereof tending to rock the lever member in a direction to bring the tip into position to be heated by the said heating means, the said spring having another portion bent to provide a yieldable latch element, the said lever member at the last-mentioned side of its pivot having a shoulder for engagement by the said latch element of the spring whereby to provide means for yieldably holding the lever member in position with the tip spaced from the heating means.

10. In a soldering iron, a handle, spaced electric contacts upon the handle, a soldering tip, and means supporting the tip for movement into and out of position engaging the said contacts and for lateral play with relation to the contacts.

11. In a soldering iron, a handle, spaced electric contacts upon the handle, a soldering tip, means supporting the tip for movement into and out of position engaging the said contacts and for lateral play with relation to the contacts, and means coacting with the tip supporting means tending to move the same to bring the tip into contact with the said electric contacts.

In testimony whereof I affix my signature.

JOHN G. CLEMENS. [L. S.]